Aug. 11, 1931.    A. BOYE    1,818,530
METHOD OF MANUFACTURING YEAST
Filed Oct. 13, 1927
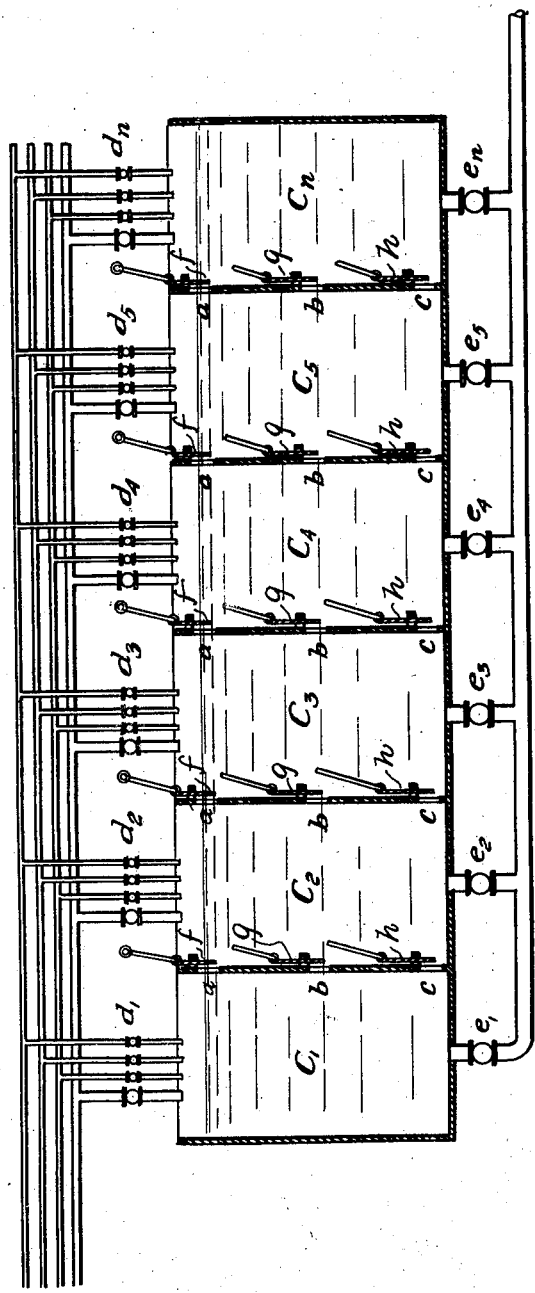
Inventor
Arne Boye
by Byrnes Townsend & Brickenstein
his Attorneys Patented Aug. 11, 1931

1,818,530

UNITED STATES PATENT OFFICE

ARNE BOYE, OF STOCKHOLM, SWEDEN

METHOD OF MANUFACTURING YEAST

Application filed October 13, 1927, Serial No. 226,048, and in Sweden October 26, 1926.

This invention relates to air-fermentation processes for the manufacture of yeast, and more particularly to continuous processes of this type. Continuous air-fermentation processes for the manufacture of yeast are known, in which the wort is caused to flow gradually through a series of cells, one after the other, the progress of the fermentation of the wort being different in the different cells.

By the term "wort" is meant any carbohydrate nutrient material or propagating liquid suitable for the propagation of yeast, which carbohydrate material may contain small amounts of phosphorous and nitrogen compounds, buffer salts, seed yeast, etc., as is well understood in the fermentation industry.

According to the present invention, the wort is not only caused continuously and successively to pass through a number of cells, but the substances required for the fermentation process are continuously supplied to the system, while ready-fermented wort is continuously tapped off.

Thus the fermentation progresses continuously and in such a manner that each cell will show a certain, approximately constant degree of fermentation of the passing wort, whereby the control of the operation is greatly facilitated.

The pretreated organic and inorganic raw materials, that is, wort, nitrogen and phosphorus nutrient materials, etc., with water and, if desired, seed yeast may be supplied continuously to the system not only in the beginning of the same, but to each of the various cells separately and, if desired, in different quantities per unit of time, in order to facilitate in each cell constant or approximately constant maintenance of the most advantageous concentrations for the corresponding stage of fermentation with regard to the composition of the wort as well as with respect to its percentage of microorganisms. In this connection, the aeration and the temperature may be different for the various cells.

By reason of the continuous flow of the wort through the cells, the latter are automatically kept clean, in that any contamination is removed with the wort, which constitutes a necessary condition for continuous, progressive and sustained fermentation.

For carrying the method into effect, there may be used, for example, a vat divided into a plurality of cells communicating with each other, or, a system of communicating vats, the connection between the various cells or vats respectively being brought about by conduits provided at different levels, so that the wort may be caused to pass from one cell or vat respectively to the next cell or vat from different levels. The conduits are preferably provided with suitable cut-off means, so that they may be opened and closed at will.

An apparatus suitable for carrying out the process is illustrated in the single figure of the accompanying drawing. The apparatus illustrated comprises a vat, shown in vertical section, divided into a plurality of cells $C_1 C_2 \ldots C_n$ communicating with each other through openings or conduits $a$, $b$ and $c$, at different levels. The conduits preferably are provided with suitable valves or the like $f$, $g$, and $h$ so that they may be opened and closed at will. The supply of substances required for the fermentation process takes place through the pipes $d_1 d_2 \ldots d_n$ and the fermented yeast is drawn off through $e_1 e_2 \ldots e_n$. Means for aeration and cooling may be provided although not shown in the drawing. As is obvious, a vat divided into a series of cells as illustrated may be replaced by any suitable equivalent thereof, such as a series of separate vats connected by conduits.

On the occurrence of contamination in the form of micro-organisms specifically lighter than the culture yeast, such as mycoderma or Kahm yeast, it is possible by suitably adapting the upper connecting conduits (the overflow outlets) to cause the mycoderma to pass through the system at a higher rate than the culture yeast, which mycoderma, consequently, will not have time to multiply as much as when, according to the earlier method, it is contained in the vat for the same length of time as the culture yeast.

By this means a purer ultimate product is obtained.

With these connecting conduits between the cells, however, it is not only possible to obtain a pure ultimate product, but also within certain limits to control the percentage of mycoderma in the ultimate product, such percentage being in certain cases desirable.

If micro-organisms specifically heavier than the culture yeast occur as a contamination, the same object may be gained by suitably adapting the lower connecting conduits.

Obviously, it is also possible by suitably adapting the connecting conduits between the cells, to purify the ultimate product from its percentage of lighter as well as of heavier micro-organisms or to control such percentage respectively.

The method according to the invention entails a considerable saving in work, the same being continuous, and, moreover, saving is obtained with respect to time and space, the cells being filled with wort for a longer time, whereas according to the older methods the vats have to be filled and emptied for each fermentation process.

What I claim as new and desire to secure by Letters Patent of the United States of America is:—

1. In an air-fermentation method of manufacturing yeast involving establishing and maintaining a plurality of yeast-fermentation batches in which the yeast is maintained at different stages of propagation and continuously passing wort serially through said batches, the steps which consist in continuously supplying to each batch separately substances required for the propagation of the yeast and continuously withdrawing liquid and yeast from said batches and recovering the yeast from the liquid.

2. In an air-fermentation method of manufacturing yeast involving establishing and maintaining a plurality of yeast-fermentation batches in which the yeast is maintained at different stages of propagation and continuously passing wort serially through said batches, the steps which consist in continuously supplying to each batch separately wort constituents required for the propagation of the yeast and continuously withdrawing liquid and yeast from said batches and recovering the yeast from the liquid.

3. In an air-fermentation method of manufacturing yeast involving establishing and maintaining a plurality of yeast-fermentation batches in which the yeast is maintained at different stages of propagation and continuously passing wort serially through said batches, the steps which consist in continuously supplying to each batch separately wort constituents other than carbohydrate nutrient material required for the propagation of the yeast and continuously withdrawing liquid and yeast from said batches and recovering the yeast from the liquid.

4. In an air-fermentation method of manufacturing yeast involving establishing and maintaining a plurality of yeast-fermentation batches in which the yeast is maintained at different stages of propagation and continuously passing wort serially through said batches, the steps which consist in continuously supplying to each batch separately carbohydrate nutrient material and other wort constituents required for the propagation of the yeast and continuously withdrawing liquid and yeast from said batches and recovering the yeast from the liquid.

5. In an air-fermentation method of manufacturing yeast involving establishing and maintaining a plurality of yeast-fermentation batches in which the yeast is maintained at different stages of propagation and continuously passing wort serially through said batches, the steps which consist in continuously supplying to each batch separately substances required for the propagation of the yeast in quantities adapted to maintain in each batch for the stage of propagation existing therein the most advantageous concentration with respect to chemical composition of the liquid and the percentage of micro organisms therein and continuously withdrawing liquid and yeast from said batches and recovering the yeast from the liquid.

6. In an air-fermentation method of manufacturing yeast involving establishing and maintaining a plurality of yeast-fermentation batches in which the yeast is maintained at different stages of propagation and continuously passing wort serially through said batches, the steps which consist in controllably introducing the wort into and withdrawing it from each batch at an upper level when the batch is contaminated with micro organisms specifically lighter than the yeast and at a lower level when the batch is contaminated with micro organisms specifically heavier than yeast, continuously supplying to each batch separately substances required for the propagation of the yeast, and continuously withdrawing liquid and yeast from said batches and recovering the yeast from the liquid.

In testimony whereof I affix my signature.

ARNE BOYE.